(12) United States Patent
Deriso et al.

(10) Patent No.: US 6,542,913 B1
(45) Date of Patent: Apr. 1, 2003

(54) INTEGRATED DOCUMENT OUTPUT MANAGEMENT IN A HYBRID ENVIRONMENT

(75) Inventors: Michael E. Deriso, Fairport, NY (US); Michael J. Herrmann, Rochester, NY (US); Judy L. Lahti, Manhattan Beach, CA (US); Kenneth W. Mitchell, Los Angeles, CA (US); Joseph A. Larosa, Coto de Caza, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/465,472

(22) Filed: Dec. 16, 1999

Related U.S. Application Data

(60) Provisional application No. 60/130,764, filed on Apr. 23, 1999.

(51) Int. Cl.[7] .............................................. G06S 15/00
(52) U.S. Cl. ...................................... 707/515; 707/523
(58) Field of Search .............................. 707/515–517, 707/523, 500–503, 526; 705/40, 10–14

(56) References Cited

U.S. PATENT DOCUMENTS

| | | | |
|---|---|---|---|
| 5,388,165 A | 2/1995 | Deaton et al. | |
| 5,710,884 A | 1/1998 | Dedrick | |
| 5,893,075 A | 4/1999 | Plainfield et al. | |
| 6,055,510 A | 4/2000 | Henrick et al. | |
| 6,061,658 A | 5/2000 | Chou et al. | |
| 6,236,975 B1 | 5/2001 | Boe et al. | |
| 6,237,011 B1 * | 5/2001 | Ferguson et al. | 707/515 |
| 6,298,348 B1 | 10/2001 | Eldering | |
| 6,336,124 B1 * | 1/2002 | Alam et al. | 707/523 |

* cited by examiner

*Primary Examiner*—Richard Chilcot
(74) *Attorney, Agent, or Firm*—Jerome D. Drabiak

(57) ABSTRACT

A customer document management system, which includes customer information store on a mainframe computer, said customer information being updateable from multiple sources. A data consolidator operates on the customer information to compile customer documents, including data reconfiguration into a customer document output database and multiple format output devices driven from the customer document output database.

4 Claims, 3 Drawing Sheets

INTEGRATED DOCUMENT OUTPUT MANAGEMENT IN A HYBRID ENVIRONMENT

REFERENCE TO RELATED APPLICATIONS

The present application is related to U.S. Ser. Nos. 09/465,465 and 09/465,466, both having filing dates of Dec. 16, 1999, which in turn are based on U.S. Provisional Ser. Nos. 60/130,762 and 60/130,763, respectively, both having filing dates of Apr. 23, 1999.

Priority is claimed from Provisional Application No. 60/130,764, filed Apr. 23, 1999.

This invention relates generally to a system solution to design, produce, and deliver effective statements and bills in a customer's chosen media in the most efficient way possible and to make them available to all appropriate internal and external business processes.

The statement and bills application is arguably the largest variable data application in the world. It is singularly responsible for the most of the printing systems products installed by all vendors today. Virtually every business especially financial services firms provide their customers bills and or statements every month.

Telecommunications and Utilities firms also provide billions of pages of bills every month to their customers. Customers have large investments and expenses devoted to paper based systems to produce and mail statements, printers, people, mail equipment postage, paper are all examples. Bills and statements are a primary means of today's businesses to reach customers on a regular basis. This is primarily due to the fact that bills and statements are one of the few documents that a customer can be trusted to read every month. Industries such as the financial institutions, securities industry, utilities, and telecommunications, are major users of high speed, high volume print services to deliver individual customer bills each and every month. These industries which are typically very conservative, are undergoing a dynamic change in the way they do business in an environment of high competition, profitability, new products, and renewed customer service and loyalty.

The ability to modify statements and bills and the processes and systems surrounding them can cause increased customer satisfaction, retention, and loyalty; mail processing costs can be reduced, customer call center costs can also be reduced, customers can be encouraged to try new products and services, and to boost brand recognition and image. In addition, an ability to introduce one to one marketing solutions into some customer engagements can allow progressive companies to communicate better with more sophisticated customers to offer better products and services. The ability to offer customers the option of having their statements and bills delivered in a format most desirable to the customer is also a big advantage and a good first step to build customer loyalty and satisfaction for many of these industries.

It is therefore desirable to have a system in which communications can be improved with customers to strengthen the customer/supplier relationship. It is further desirable to enable bills and statements to become marketing tools and to have the ability to cross-sell additional services and products to specific targeted individuals. It is further desirable to improve productivity by lowering costs in both the delivery method and the processing times, and further to shorten cycle times for both bill and statement generation.

In accordance with one aspect of the present invention, there is provided a customer document management system, comprising customer information stored on a mainframe computer, said customer information being updateable from multiple sources, a data consolidator operating on said customer information to compile customer documents including data reconfiguration into a customer document output database, multiple format output devices driven from the customer document output database.

In accordance with another aspect of the invention herein there is provided A method of creating variable format customer documents comprising storing customer information on a mainframe computer, said customer information being updateable from multiple sources, transmitting said customer information to a consolidating device to reconfigure the customer information into a customer document output database and creating variable format customer documents based on customer preferences from the customer document output database.

Other features of the present invention will become apparent as the following description proceeds and upon reference to the drawings, in which.

Figure 1:
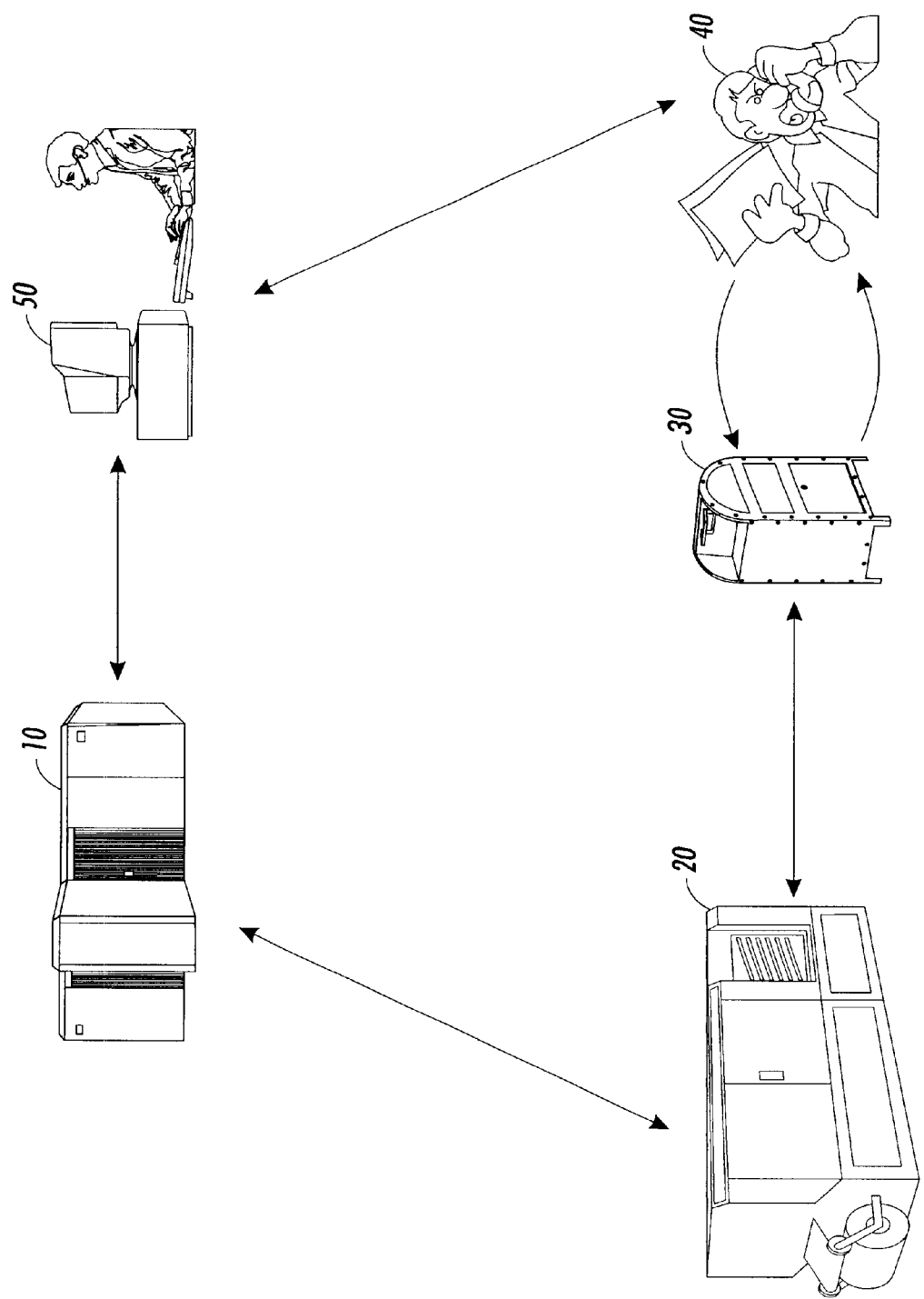
FIG. 1 is a flow diagram illustrating the traditional flow of typical statements and bills issued by the industries described above.

Turning to FIG. 1, there is illustrated the flow diagram that illustrates the typical work flow for a bill or statement from a utility, telecommunications, financial institution, or securities institution to a customer. Customer records are typically maintained in legacy applications on mainframe computers 10. These mainframe computers generate customer data and transmit the information to high speed black and white and/or highlight color printers in either an AFP or Metacode format. These printers 20 generate voluminous paper statements and bills which are then either manually or automatically put into envelopes and mailed 30 to various customers. Customers 40 then receive their bills and in turn mail 30 back payments or call customer services representatives (CSRs) 50 if there is a question or problem with their billing statement.

Another issue arises when a customer contacts a customer service representative to make an inquiry or complaint about their bill and/or statement. When a call is placed to a customer service representative, the customer service representative accesses the data on the mainframe computer 10, which data is displayed in a format that is totally unlike the format received by the customer in the statement or bill. Thus, when a customer 40 having a telephonic conversation with the customer service representative 50 references the problem such as "such and such on page 3", the customer service representative does not have the same view as the customer and may find it difficult to access the same data to answer the customer's questions. This dissimilar view of the data can be a frustrating problem or both the customer and the customer service representative and may be the source for much customer dissatisfaction.

Additionally, the customer receives the bill and/or statement in paper format regardless of any preference they may desire. In some cases, commercial customers may receive bills that have pages numbering in the tens of thousands and that may take several days to review to assure that proper credits and/or charges have been applied.

Figure 2:
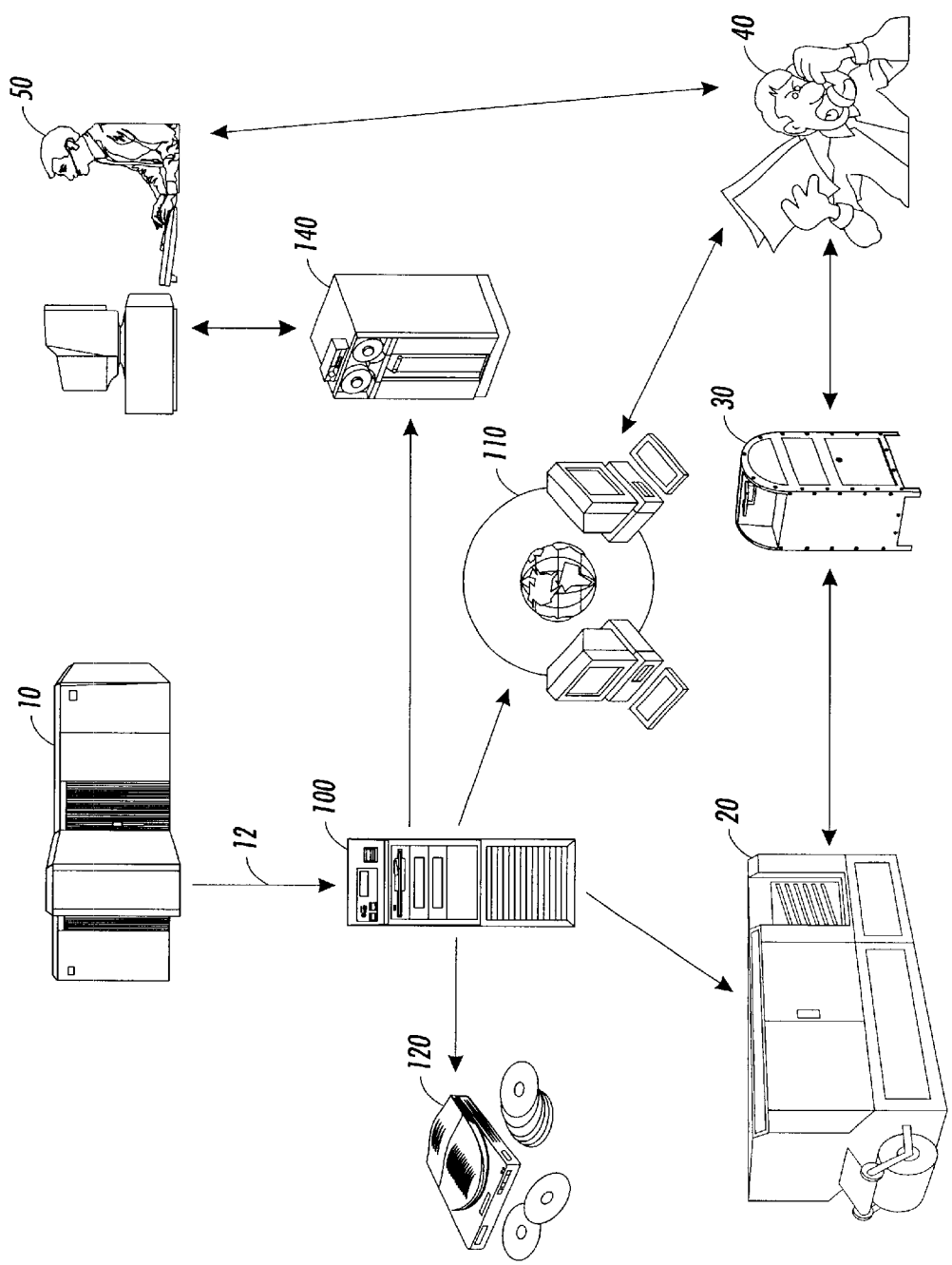
FIG. 2 is a flow diagram illustrating the improved delivery system as set forth herein.
Figure 3:
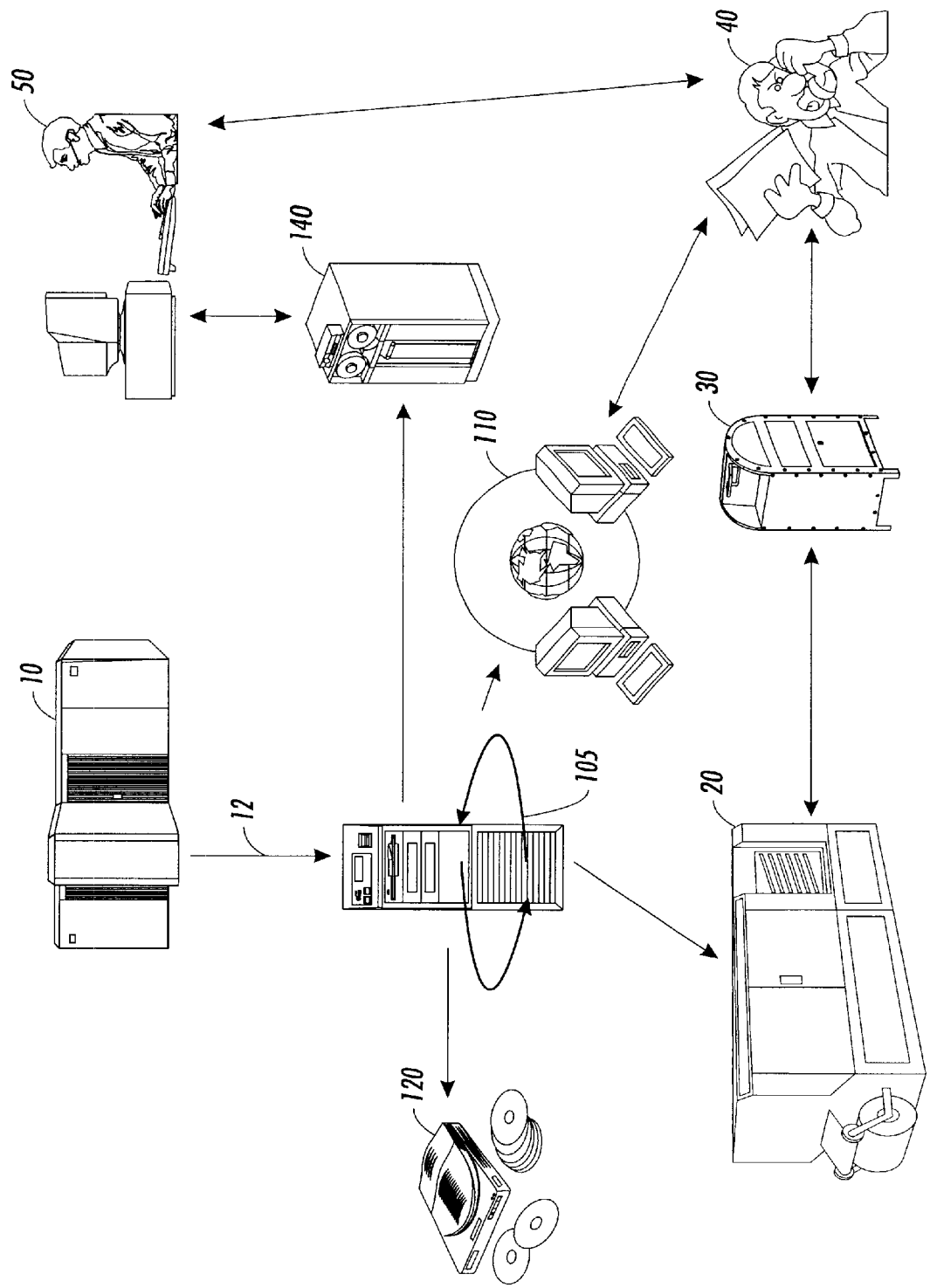
FIG. 3 is a flow diagram indicating the improved system including data mining.

Turning now to FIG. 2, there is illustrated a flow diagram of the system solution and method of the invention claimed herein. As in the current set up, the customer raw data information is contained and stored on a mainframe computing system 10. The data stream and/or print stream 12 from the mainframe computer 10 in formats such as AFP, LCDS/Metacode, line data, ASCII, XML, or EDI is transmitted to a composition consolidating server 100 which parses the data and/or print stream received form the mainframe and reconfigures the customer data into a new database. This server 100 that is in the center of this new model—literally and figuratively—is a hub server that provides intelligent routing and integrated output management. One key function of the hub server is implementation of electronic bill presentment and payment. The reconfigured data is then available for compilation into a variety of media and/or format possibilities for delivery to a customer.

As is shown in FIG. 2, the data may be formatted and transmitted to a high speed black and white, highlight color, or full color printer 20 for conversion into a printed statement or bill, which statement or bill will then be sent by traditional mail 30 to the end user 40. Additionally, the data may be compiled and transmitted via electronic means such as the Internet 110 to customers for receipt and viewing electronically. An option is also available for large commercial customers in which the statement and/or bill would be compiled onto a CD ROM 120 or other like media and delivered to the customer, wherein that customer could then search or otherwise manipulate the data to allow convenient charging to various accounts and other divisions within its own company. This technology is referred to as Computer Output to Laser Disk Technology (COLD).

An additional customer satisfier is that the statement and/or bill which is sent to a customer can be mirrored on an archival system 140 for viewing by a customer service representative 50. This enables a customer service representative (CSR) to view the very same information that is being viewed by a customer when the customer calls with an inquiry and/or complaint. This ability to view the same document that is in front of a customer will provide the opportunity for much better understanding between the CSR and a customer and should result in greater customer satisfaction.

Another advantage of the hub server 100 is that the data may be "mined" 105 or sorted to address specific products and/or services to specific customers based on their buying habits or other preferences or trends as indicated by the data. These specific offers or services can be included in the monthly statement or bill in whatever format the customer has chosen.

Another advantage of the present system is that form design services can be offered in addition to the system and very customized documents may be created that offer the best features for the media requested by a customer. For example, a printed statement may highlight certain categories in color or offer specific products in a full color advertisement. An Internet statement may contain animation or other dynamic data to attract a customer's attention to an offer.

In recapitulation, there is provided a customer document management system, which includes customer information stored on a mainframe computer, said customer information being updateable from multiple sources. A data consolidator operates on the customer information to compile customer documents, including data reconfiguration into a customer document output database and multiple format output devices driven from the customer document output database.

It is, therefore, apparent that there has been provided in accordance with the present invention, a an integrated document output management method for a hybrid environment method that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A customer document management system, comprising:

customer information stored on a mainframe computer, said customer information being viewable on a first screen at a first location and updateable from multiple sources at associated multiple locations, the first location being one of said multiple locations;

a data consolidator operating on said customer information to compile customer documents including data reconfiguration into a customer document output database, said customer documents including said data reconfiguration being viewable on a second screen at a second location, the second location being another one of said multiple locations;

and a plurality of multiple format output devices driven from the customer document output database, said multiple format output devices being in communication with the first screen and the second screen, wherein one of said multiple format output devices comprises a means for producing a digital customer document viewable on both of the first screen and the second screen, for enabling the digital customer document to be delivered to a customer in a format desired by the customer.

2. A system according to claim 1, wherein another one of said multiple format output devices comprises means for producing a paper customer document.

3. A system according to claim 1, wherein another one of said multiple format output devices comprises means for producing an electronic customer document.

4. A method of creating variable format customer documents comprising:

storing customer information on a mainframe computer, said customer information being viewable on a first screen at a first location and updateable from multiple sources at associated multiple locations, the first location being one of said multiple locations;

transmitting said customer information to a consolidating device to reconfigure the customer information into a customer document output database, said reconfigured customer information being viewable on a second screen at a second location, the second location being another one of said multiple locations;

creating a plurality of variable format customer documents from the customer document output database, wherein one of said variable format customer documents is a digital customer document viewable on both of the first screen and the second screen, for enabling the digital customer document to be delivered to a customer in a format desired by the customer.

\* \* \* \* \*